UNITED STATES PATENT OFFICE.

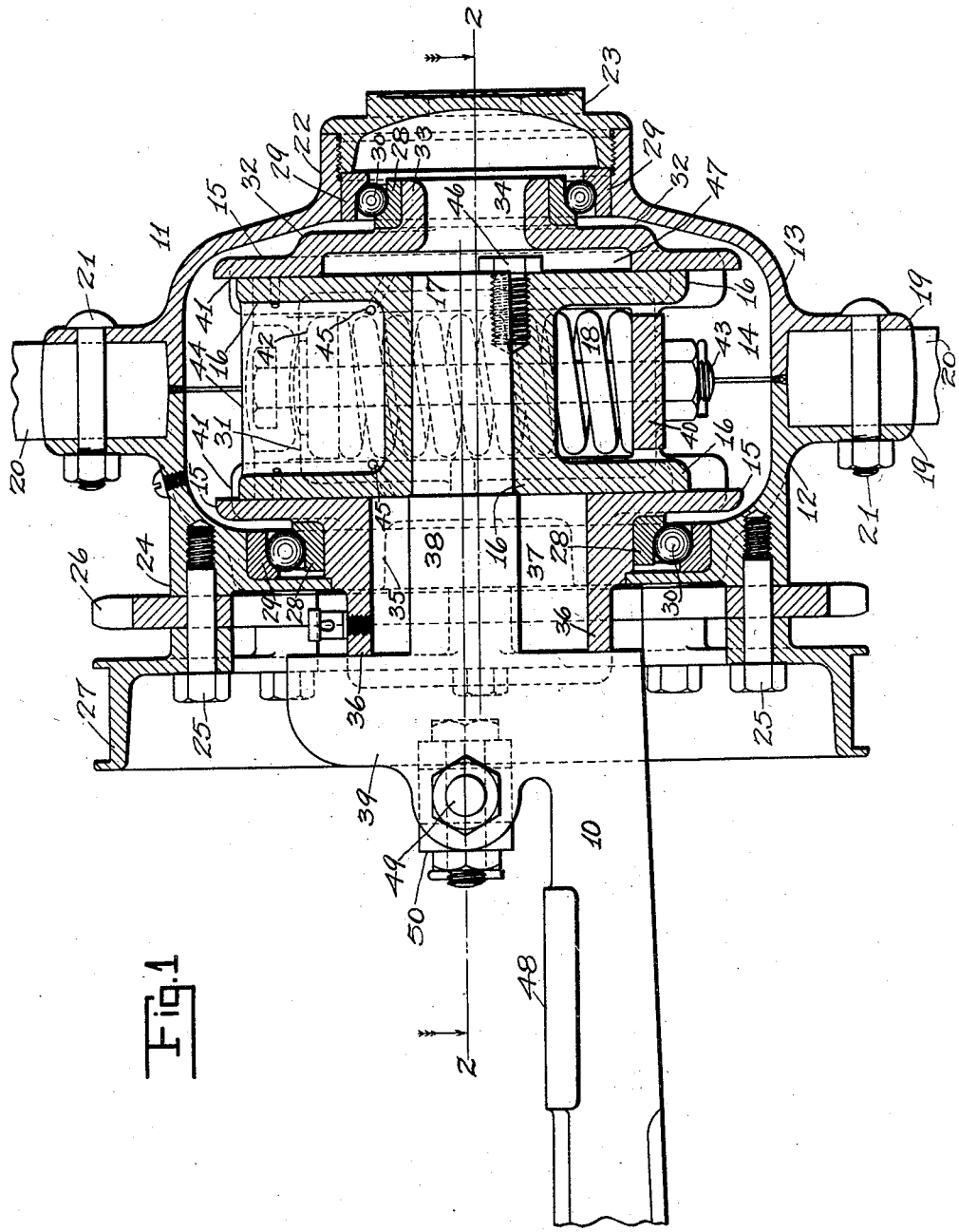

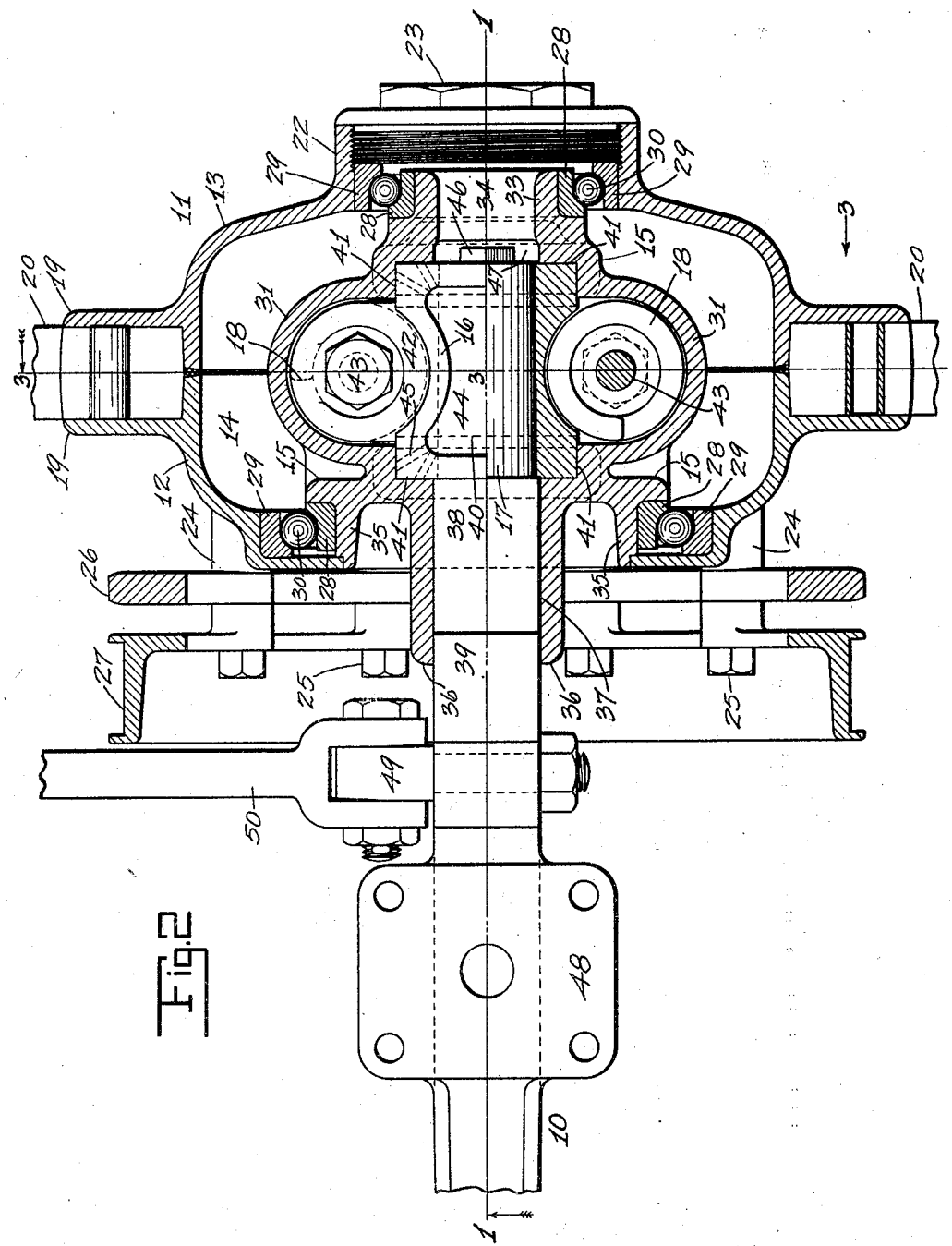

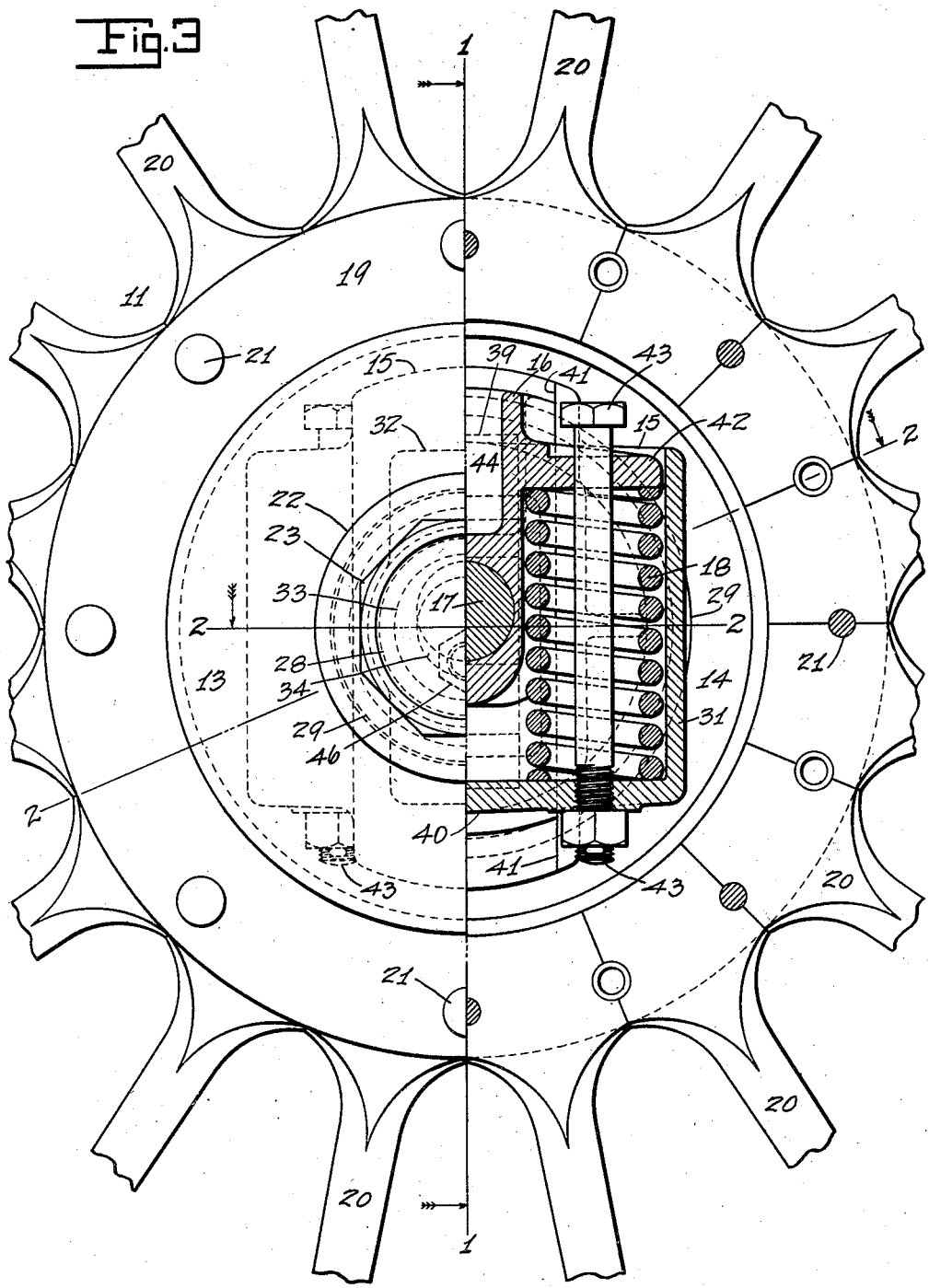

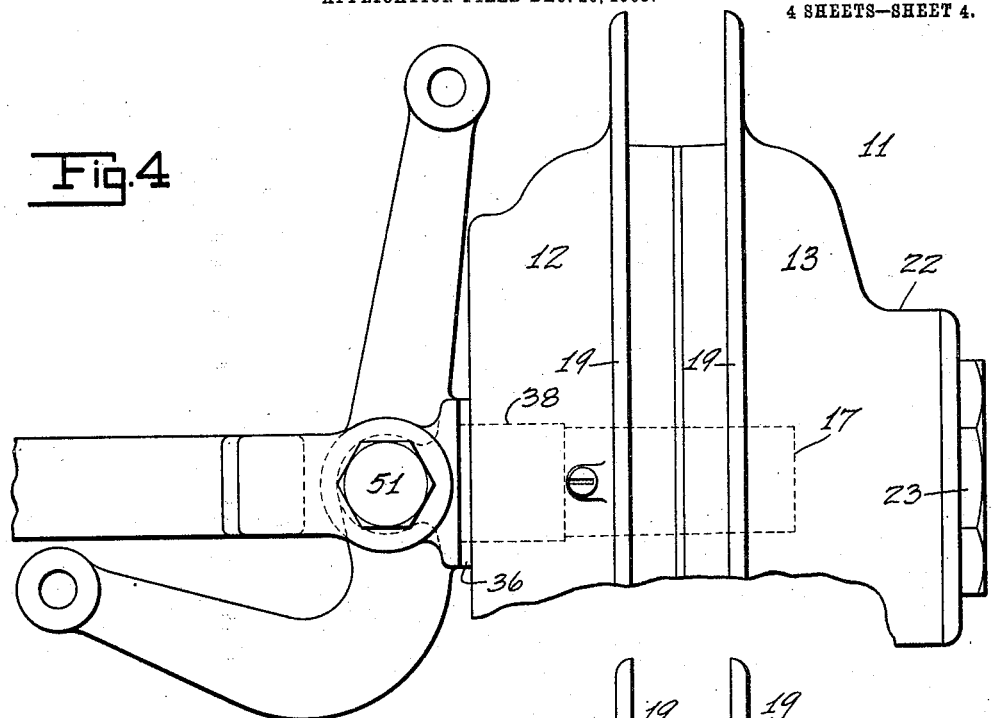
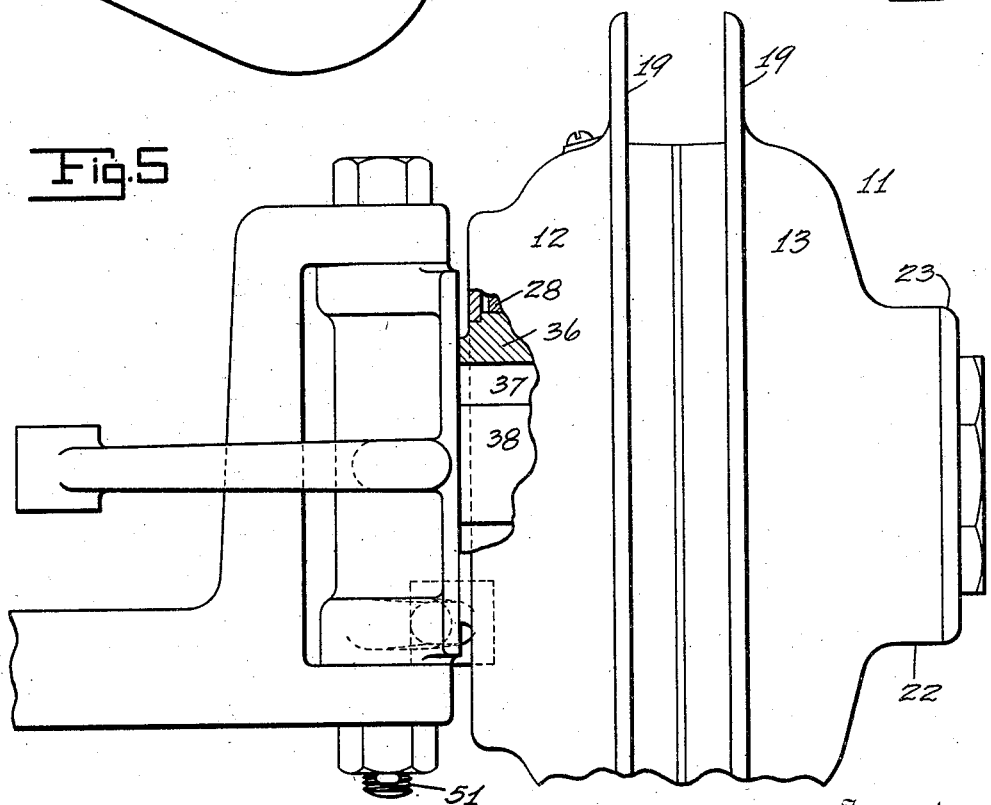

EDWARD CLIFF, OF NEW YORK, N. Y.; JANE CLIFF ADMINISTRATRIX OF SAID EDWARD CLIFF, DECEASED.

AUTOMOBILE.

No. 845,031.  Specification of Letters Patent.  Patented Feb. 19, 1907.

Application filed December 26, 1905. Serial No. 293,241.

*To all whom it may concern:*

Be it known that I, EDWARD CLIFF, a citizen of the United States, and a resident of New York city, in the county of New York and State of New York, have invented certain new and useful Improvements in Automobiles and other Vehicles, of which the following is a specification.

The invention relates to improvements in automobiles and other vehicles; and it consists in the novel features, arrangements, and combinations of parts hereinafter described, and particularly pointed out in the claims.

Among the objects of my invention are to provide an easy-riding vehicle, to provide for the supporting of the axles on springs located within the hubs of the wheels, and to furnish a novel hub construction capable of ready manufacture and adapted when occasion requires to permit of the ready withdrawal of the wheel from the end of the axle.

My invention embodies certain improvements on or along the line of the invention described and claimed in Letters Patent of the United States No. 792,649, granted June 20, 1905, to Edward Cliff.

The present invention pertains to a novel, simplified, and more convenient construction and arrangement of the wheel-hub and its contained parts and the end portion of the axle, and said invention will be fully understood from the detailed description hereinafter presented, reference being had to the accompanying drawings, in which—

Figure 1 is a central vertical transverse section through the hub portion of a wheel embodying my invention, a portion of the end of the axle for the wheel being shown and the section being on the dotted line 1 1 of Fig. 2. Fig. 2 is a horizontal section of same on the dotted line 2 2 of Fig. 1, the axle being shown in top elevation and one-half of the inner vertically-movable frame, which is mounted on the axle and bears on the springs, being also shown in top elevation. Fig. 3 is a view of the wheel-hub, taken from the outer end thereof, one half of said hub being shown in elevation and the other half thereof in section on the dotted line 3 3 of Fig. 2. Fig. 4 is an exterior top view of a portion of the front wheel-hub of an automobile; and Fig. 5 is a front elevation, partly broken away and partly in section, of same, Figs. 4 and 5 being presented to illustrate the application of the invention to the front wheels of an automobile, while such application to the rear wheels is shown in Figs. 1 and 2.

In the drawings, 10 designates the axle, and 11 the hub of the wheel, this hub being composed of two vertical cup-sections 12 13, which when brought together form an interior chamber 14 to contain the non-rotatable frame 15 and vertical non-rotatable frame 16, which is carried on the reduced and slightly-tapered end 17 of the axle 10 and at its upper opposite edges bears upon the springs 18.

The hub-sections 12 13 are formed with annular flanges 19, between which is formed a chamber to receive the inner ends of the spokes 20, the latter being secured in position and said sections being fastened together by bolts 21.

The outer hub-section 13 is formed with a central horizontal opening surrounded by a threaded flange 22, adapted to receive a closing-cap 23. The inner hub-section 12 is open at its center and beyond this opening is formed with a series of lugs 24, to which, by means of bolts 25, are secured the sprocket-wheel 26 and brake-flange 27.

The frame 15 is preferably in one integral casting and supports raceways 28, which coöperate with raceways 29, carried by the hub-sections, in receiving and retaining the ball-bearings 30, upon which the hub 11 rotates. The hub 11 rotates around the frame 15, and the latter affords a fixed axial center for the wheel and is not movable within said hub.

The frame 15 is formed with semicircular vertical edge sections or boxes 31 to receive the coiled springs 18, and said frame has an outer or front wall 32, from which projects outwardly a circular flange 33, supporting the outer raceway 28 and surrounding an opening 34 in line with the opening in the outer face of the hub-section 13. At its inner end the frame 15 has a circular flange 35, Fig. 2, supporting the inner raceway 28, and also a box-like section 36, affording side, top, and bottom walls around a rectangular opening 37, into which a rectangular section 38 of the axle 10 projects, said section 38 fitting snugly but not too tightly between said side walls and being free of said top and bottom walls, whereby said section 38 permits vertical movement of the wheel-hub and prevents the frame 15 from rotating with said hub. The side walls of the opening 37 extend outwardly slightly beyond the rectangular portion 38 of the axle 10 and lap and guide upon the sides of a vertical section 39 of said axle, as indicated by dotted lines in Fig. 1 and full lines in Fig. 2, and, as shown in Fig. 1, said section 39 extends above and below the opening 37 and serves thereby to exclude dust from said opening and also to afford guiding and bearing surfaces for the ends of the top and bottom walls of the opening 37.

At its lower portion the frame 15 is formed with a horizontal support 40, Figs. 1 and 3, for the coiled springs 18, and at its vertical center the frame 15 is open to receive and guide on the frame 16, which is angular at its corners, as shown in Fig. 2, and fits snugly but not too tightly within angular guiding-recesses 41 in the frame 15.

The frame 16 has a horizontal bore and fits upon the section 17 of the axle 10, and at its upper opposite transverse edges said frame 16 is formed with horizontal plates 42, fitting freely within the semicircular sections 31 of the frame 15 and bearing on the coiled springs 18. The plates 42 are apertured to permit the free passage through them of the bolts 43, which are threaded at their lower ends, Fig. 3, and screwed into threaded apertures in the horizontal support 40 for the springs 18. The bolts 43 pass through the springs 18. When the normal weight of the body of the vehicle acting through the axle 10 and frame 16 is on the springs 18, the latter will be partly compressed and the plates 42 will be below the heads on the bolts 43, as shown in Fig. 3. The lower portion of the frame 16 is open between its sides, as shown in Fig. 1, to receive and permit vertical play of the spring-support 40.

The frame 16 closes the inner end of the axle-opening 37 in the frame 15, and the sides of said frame 16 coöperate with the adjacent surfaces for the frame 15 in affording guiding-surfaces for the vertical movement of the frame 15 with the wheel or the like movement of the frame 16 with the axle 10. In the top of the frame 16 is formed a cup 44 to contain a lubricant, which may feed through openings 45 and lubricate the adjoining guiding-surfaces of the frames 15 16.

The frame 16 is preferably fastened upon the section 17 of the axle 10 by means of a screw 46, which enters a threaded socket formed partly in said section 17 and partly in the frame 16, as indicated in Fig. 1, and the adjacent portion of the frame 16 is chambered, as at 47, to admit of the vertical movement of said frame (with the wheel) without contacting with the head of said screw.

The frame 16 cannot rotate with the wheel, because it is fastened to the axle 10, and the frame 15 cannot rotate, because it is held against such movement both by the frame 16 and by the section 38 of the axle. The frame 15, however, partakes of any vertical movement of the wheel and at such time slides vertically on the frame 16 and axle-section 38.

Upon the axle 10 is provided a seat 48 for the usual elliptic spring upon which the body of the vehicle is mounted, and to the section 39 of the axle is applied an eyebolt 49 to receive the usual stay-rod 50.

In the employment of the invention the ends of the axle become spring-supported, due to the fact that the frame 16 bears upon the springs 18, and the wheel while rotating upon the frame 15 as an axial center always in fixed relation to the wheel may have free vertical movement and is cushioned by said springs, the wheel in its vertical movements being guided and kept in true position by the movement of the frame 15 on the frame 16 and axle-sections 38 39.

One of the objects accomplished by this invention is that it provides a very easily manufactured and applied mechanism for carrying out the general purposes of the invention described in the aforesaid Letters Patent No. 792,649. The end of the axle 10 is of simple form, easily manufactured, and the frames 15 16 may be readily manufactured and fitted together. The hub 11, being in two vertical sections, may be readily applied upon the interior spring mechanism, and a very important object accomplished by the present construction is that it enables the removal of the wheel from the axle without separating the sections of the hub. When it is desired to remove the present wheel, the cap 23 will be removed and the axle will be jacked up to allow the wheel to lower enough for the opening 34 in the frame 15 to pass into line with the screw 46, and thereupon said screw will be withdrawn and leave the wheel and axle free to be separated one from the other, there being nothing after the screw 46 is removed but the tight fit of the axle-section 17 in the frame 16 to interfere with the direct withdrawal of the wheel from the axle.

In Figs. 4 and 5 I show the application of the invention to the front wheels of an automobile, and in such application the only material change made in the construction is to swivel on a bolt 51 that portion of the axle which enters the hub 11.

I deem it advantageous that the non-rotatable frame or casing 15 affords boxes or vertical chambers 31 for the springs 18 at opposite sides of the axle and that the frame 16, carried by the axle, has its parts 42 extended into said chambers and upon said springs, since thereby the axle proper may be extended substantially across the hub and the cushioning action equalized on opposite sides thereof. It will be observed on reference to Fig. 1 that the axle projects into and substantially across the spring-chamber formed within the non-rotatable frame 15 and carries within said chamber the frame 16 to bear upon both springs 18, said springs constituting a spring member between the vertical planes of the ends of which the end of the axle and frame 16 are interposed. The springs 18 preferably extend above and below the axle, as shown, whereby I am enabled to use springs of considerable length without making the wheel-hub unduly large.

What I claim as my invention, and desire to secure by Letters Patent, is—

1. In a vehicle, an axle and wheels on the ends thereof, said wheels each having a hollow hub which is closed except at its inner face where it is open to receive the end of the axle, combined with spring cushioning means inclosed within said hub for the end of said axle and comprising a non-rotatable frame around which the wheel may turn affording at opposite sides of the vertical plane of the axle and below the same a support for the springs, coiled springs on said support continuously extending upwardly at opposite sides of the axle to points above said axle, and a part secured upon the axle and extending above the same and above said axle bearing upon the upper ends of said continuous springs, said part and said frame being adapted to have a sliding relation to each other; substantially as set forth.

2. In a vehicle, an axle and wheels on the ends thereof, said wheels each having a hollow hub open at its inner face to receive the end of the axle, combined with spring cushioning means within said hub for the end of said axle, said means comprising a non-rotatable frame around which the wheel may turn and affording continuous vertical chambers at opposite sides of the axle and extending above and below the horizontal plane of the same, coiled springs confined within said chambers and extending continuously from their supports below to the top of said chambers above the horizontal plane of said axle, and a part secured upon the axle and extending above the same and bearing upon the upper ends of said continuous springs, said part and said frame being adapted to have a sliding relation to each other; substantially as set forth.

3. In a vehicle, an axle and wheels on the ends thereof, said wheels each having a hollow hub formed of vertical cup-sections bolted together to form a hub which is closed except at its inner face where it is open to receive the end of the axle, combined with spring cushioning means inclosed within said hub for the end of said axle and comprising a non-rotatable frame around which the wheel may turn affording at opposite sides of the vertical plane of the axle and below the same a support for the springs, coiled springs on said support continuously extending upwardly at opposite sides of the axle to points above said axle, and a part secured upon the axle and extending above the same and above said axle bearing upon the upper ends of said continuous springs, said part and said frame being adapted to have a sliding relation to each other; substantially as set forth.

4. In a vehicle, an axle and wheels on the ends thereof, said wheels each having a hollow hub open at its inner face to receive the end of the axle and a removable cap on its outer face, combined with spring cushioning means within said hub for the end of said axle, said means comprising a non-rotatable frame around which the wheel may turn and affording a support for the spring member, a spring member mounted on said support, a frame carried by the axle and engaging said spring member, and means in line with said cap and removable through the opening closed by the same for locking said frame and axle together, said non-rotatable frame being open in line with said cap and the end of said axle and the means locking it to the frame carried by it being exposable through said opening when said cap is removed; substantially as set forth.

5. In a vehicle, an axle and wheels on the ends thereof, said wheels each having a hollow hub open at its inner face to receive the end of the axle and a removable cap on its outer face, combined with spring cushioning means within said hub for the end of said axle, said means comprising a non-rotatable frame around which the wheel may turn and affording a support for the spring member, a spring member mounted on said support, a frame through which the end of the axle projects and which engages said spring member, and means at the end of said axle for locking said frame and axle together, said frame on the axle and said non-rotatable frame having a sliding relation to each other, and the end of said axle and its locking means being exposable upon the removal of said cap; substantially as set forth.

6. In a vehicle, an axle and wheels on the ends thereof, said wheels each having a hollow hub open at its inner face to receive the end of the axle, and said hollow hub containing a non-rotatable frame around which the wheel may turn and which affords a support for the spring member and has a vertical angular opening at the inner side of the hub, and said axle having an angular section adapted to said opening and also a vertical section closing the outer end of said opening, combined with a spring member mounted on said support, and a part carried by the axle within said hub and bearing on said spring member, said part and said angular section of the axle having a sliding relation with said non-rotatable frame; substantially as set forth.

7. In a vehicle, an axle and wheels on the ends thereof, said wheels each having a hollow hub open at its inner face to receive the end of the axle, combined with spring cushioning means within said hub for the end of said axle, said means comprising a non-rotatable frame around which the wheel may turn and affording a support for springs at the sides of the axle, springs mounted on said support and extending above and below the end of the axle, and a part on the axle having portions extended upon said springs, said part and said frame being adapted to have a sliding relation to each other; substantially as set forth.

8. In a vehicle, an axle and wheels on the ends thereof, said wheels each having a hollow hub open at its inner face to receive the end of the axle, combined with spring cushioning means within said hub for the end of said axle, said means comprising a non-rotatable frame around which the wheel may turn and affording vertical chambers at opposite sides of the axle, springs within said chambers and extending above and below the end of the axle, and a part on the axle having portions extended upon said springs, said part and said frame being adapted to have a sliding relation to each other; substantially as set forth.

9. In a vehicle, an axle and wheels on the ends thereof, said wheels each having a hollow hub open at its inner face to receive the end of the axle, combined with spring cushioning means within said hub for the end of said axle, said means comprising a non-rotatable frame around which the wheel may turn, springs mounted on said frame at opposite sides of the axle, an intermediate frame mounted on the end of the axle and having portions extended upon said springs, and bolts passing freely through said portions and said springs and screwed into said non-rotatable frame, the latter frame and said intermediate frame having a sliding relation to each other; substantially as set forth.

Signed at New York city, in the county of New York and State of New York, this 22d day of December, A. D. 1905.

EDWARD CLIFF.

Witnesses:
  JANE CLIFF,
  CHAS. C. GILL.